H. Berix.
Bee Hive.

Nº 91,203.  Patented Jun. 15, 1869.

Witnesses.

Inventor.
Henry Berix
by Prindle and Dyer

United States Patent Office.

HENRY BERIX, OF PETERSBURG, OHIO.

Letters Patent No. 91,203, dated June 15, 1869.

---

IMPROVEMENT IN BEE-HIVES.

---

The Schedule referred to in these Letters Patent and making part of the same.

---

*To all whom it may concern:*

Be it known that I, HENRY BERIX, of Petersburg, in the county of Mahoning, and in the State of Ohio, have invented certain new and useful Improvements in Bee-Hives; and do hereby declare that the following is a full, clear, and exact description thereof, reference being had to the accompanying drawing, making a part of this specification, in which—

Letters of like name and kind refer to like parts in each of the figures.

The nature of my invention consists principally in providing a moth-trap upon opposite sides of a hive, which is so constructed as to trap and securely hold moths, and also strange bees, and thus prevent their entrance to the hive.

It also consists in the construction and arrangement of the box, and of a hinged support attached thereto, by means of which said box is not only drawn out with great facility, but, when so drawn out, is automatically supported, as will be fully described hereinafter.

In the annexed drawing—

A A' represent the front and back, B the top, and C the bottom of the hive, which is open at its sides.

A partition, D, extends horizontally across the hive, at a point one-third of the distance from the top to the bottom, and furnishes a support for the boxes E E for containing honey for use.

Said boxes, E E, are provided with openings, e e, in their bottom side, corresponding with other openings, d d, in the partition D, through which access is had by the bees from the lower part of the hive. The ends of said boxes are constructed of glass, so as to permit a view of their interior to be had.

F represents a frame or box fitting loosely within the space in the lower part of the hive, in which is suspended a number of comb-frames, G G, &c., by means of their upper rails, g g, &c., which extend beyond the side-pieces g' g', and rest upon the upper edge of said frame F.

A cross-piece, g'', divides each frame horizontally into equal spaces, while two wires, g''' g''', extend vertically from the upper to the lower rails, at points equidistant from each other, and from the side-pieces, the whole furnishing a good and sufficient support for the combs.

Figure 2:
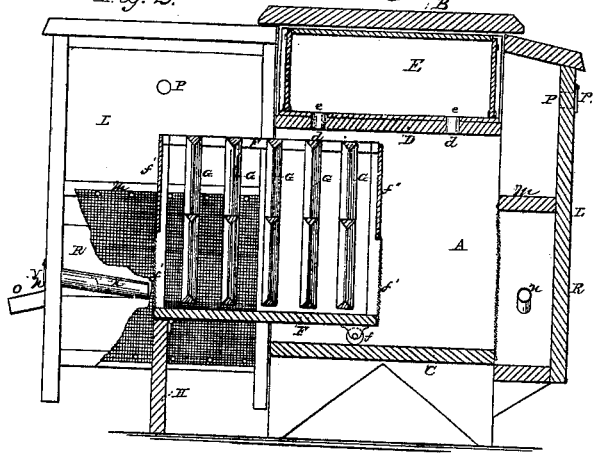
Figure 2 is a vertical cross-section, showing one of the side traps open.
Figure 3:
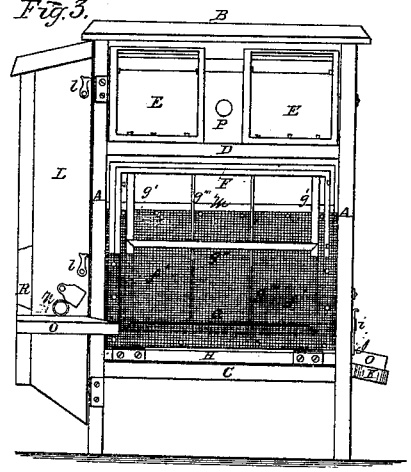
Figure 3 is a side elevation, with one of the traps partly opened.

One side of the box F is supported upon two rollers, f, while the opposite side rests upon a board, H, corresponding in thickness with the height of said rollers, and in breadth to the width of the box to which it is hinged, so that when said box is drawn out, (as shown in fig. 2,) said board shall assume a vertical position and furnish a support for said box.

The lower half of the outer sides is covered with wire gauze, f', (the object of which will be hereinafter explained,) and the upper half of said sides is covered with glass, f'', through which interior of said box may be observed without disturbing its contents.

Access to the interior of the hive, for the bees, is had through a rectangular opening, a, which is opened or closed by means of a gate, I, formed of a plate of sheet-metal, secured to the hive by means of a screw, i, having a broad head, and passing through a vertical slot in said gate.

Directly beneath said opening is a shelf or ledge, K, which furnishes a resting-place for the bees when starting from or returning to the hive.

Hinged to and covering each open side of the hive is a box, L, which corresponds in width and height to said side, and in horizontal depth to about one-third of that of said hive.

The space within said box is divided by a horizontal partition, M, and the lower part, next to the hive, is covered by wire gauze, while the upper half is left open.

The free edge of said box is secured to said hive by hooks and pins, l l, or by any other suitable means.

N represents an opening made in the front side of the box L, to which is fitted a pipe, n, extending inward and slightly downward.

Two ledges, O O, is placed immediately beneath said opening, both of which are somewhat above the opening a, and extend diagonally over the ledge K.

Another opening, P, communicating with the upper space, is made through the side wall of said box, and is provided with a slide, p, for partly or entirely closing said opening.

The principal object for which the boxes L L are designed, is to trap moths and strange bees, and thus prevent them from obtaining access to the hive. This result is accomplished by means of the position and size of the openings n n, and the position of the ledges O O, both of which are more prominent than the entrance of the hive.

The moth or strange bee alighting upon either of the ledges O O, is attracted by the scent of the honey, (which passes freely from the comb-frames,) into the interior of said boxes, and enters the opening, and passes through the tube to the interior, where it is securely trapped; it being almost impossible for said moth or bee to regain the tube and escape.

Figure 1:
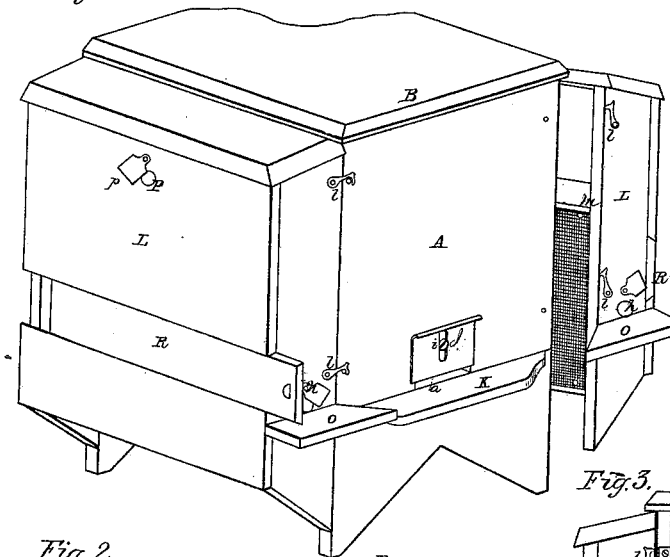
Figure 1 is a perspective view of my improved hive.
Figure 4:
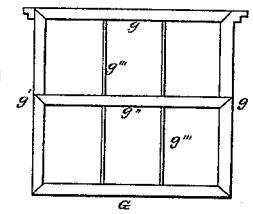
Figure 4 is a plan view of one of the comb-sections.

In order to remove the insects from the trap when desired, access may be had by means of a slide, R, which is provided in each, as seen in fig. 1.

Another object intended by the use of the boxes L L, is protection of the hive from cold during the winter.

The openings P are for the purpose of ventilating the interior of the hive during the same period, and the quantity of air entering may be graduated by means of the covers $p$.

Having thus fully set forth the nature and merits of my invention,

What I claim as new, and desire to secure by Letters Patent, is—

The frame or box F, provided with the rollers $f$, and hinged support H, substantially as and for the purpose shown.

Also, the comb-frames G G, &c., when provided with the horizontal wooden cross-piece $g''$, and vertical wires $g'''$, substantially as herein set forth, and for the purpose specified.

Also, the insect-traps L L, when constructed and attached to the hive, substantially as and for the purpose shown.

Also, the arrangement of the ledges K and O O, for the purpose specified.

In testimony that I claim the foregoing, I have hereunto set my hand, this 21st day of April, 1869.

HENRY BERIX.

Witnesses:
 DAVID MANEWAL,
 SUE McCOWN.